US006782421B1

(12) United States Patent
Soles et al.

(10) Patent No.: US 6,782,421 B1
(45) Date of Patent: Aug. 24, 2004

(54) SYSTEM AND METHOD FOR EVALUATING THE PERFORMANCE OF A COMPUTER APPLICATION

(75) Inventors: William E. Soles, Grayson, GA (US); Joseph Morgan, deceased, late of Birmingham, AL (US), by Leon E. Morgan, Jr., legal representative; Arthur J. Anth, Cumming, GA (US); Marion B. Thompson, Riverdale, GA (US); Edward T. O'Shea, Lawrenceville, GA (US); Frank E. Garguilo, Marietta, GA (US); Amy H. Bowlin, Bentonia, MS (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 105 days.

(21) Appl. No.: 10/191,882

(22) Filed: Jul. 9, 2002

Related U.S. Application Data

(63) Continuation of application No. 09/997,394, filed on Nov. 29, 2001, now abandoned, which is a continuation of application No. 09/813,691, filed on Mar. 21, 2001, now abandoned.

(51) Int. Cl.$^7$ ............................................. G06F 15/173
(52) U.S. Cl. ...................... 709/223; 709/200; 709/224; 709/226; 709/229; 718/100; 718/104; 370/252
(58) Field of Search ............................... 709/200–203, 709/217–219, 220–221, 223–229, 236, 250; 718/100, 104–106; 370/229–235, 238, 248, 252–254

(56) References Cited

U.S. PATENT DOCUMENTS

| | | | | |
|---|---|---|---|---|
| 5,944,793 A | * | 8/1999 | Islam et al. ................. | 709/220 |
| 6,058,102 A | * | 5/2000 | Drysdale et al. ............ | 370/252 |
| 6,182,136 B1 | * | 1/2001 | Ramanathan et al. ....... | 709/224 |
| 6,269,401 B1 | * | 7/2001 | Fletcher et al. ............. | 709/224 |
| 6,286,047 B1 | * | 9/2001 | Ramanathan et al. ....... | 709/224 |
| 6,308,216 B1 | * | 10/2001 | Goldszmidt et al. ........ | 709/224 |
| 6,321,264 B1 | * | 11/2001 | Fletcher et al. ............. | 709/224 |
| 6,336,138 B1 | * | 1/2002 | Caswell et al. ............. | 709/223 |
| 6,490,620 B1 | * | 12/2002 | Ditmer et al. .............. | 709/224 |
| 6,643,613 B2 | * | 11/2003 | McGee et al. .............. | 709/224 |
| 6,681,232 B1 | * | 1/2004 | Sistanizadeh et al. ....... | 709/224 |
| 6,701,342 B1 | * | 3/2004 | Bartz et al. ................. | 709/200 |
| 6,718,358 B1 | * | 4/2004 | Bigus et al. ................ | 718/100 |

* cited by examiner

*Primary Examiner*—Bharat Barot
(74) *Attorney, Agent, or Firm*—Kirkpatrick & Lockhart LLP

(57) ABSTRACT

A system for evaluating the performance of a computer-implemented application, wherein the performance is measured in terms of availability. The system includes a metrics data module comprising actual service level data, wherein the actual service level data can be used to determine an actual service level; a defined data module comprising defined service level data, wherein the defined service level data can be used to determine a defined service level; and a service level analysis module in communication with the metrics data module and the defined data module for calculating the actual service level and the defined service level and for comparing the actual service level to the defined service level using a grading scale defined as a function of the defined service level.

49 Claims, 23 Drawing Sheets

56

| GRADE | MEANING |
|---|---|
| A | Meets or Exceeds Expectations - best practice is fully implemented |
| B | Meets Expectations with minor room for improvement |
| C | Needs improvement |
| D | Requires improvement |
| F | Immediate improvement required - cannot meet SL, occurs frequently, is revenue impacting |

FIG. 4

| AVAILABILITY LEVEL | APPLICATION AVAILABILITY CHARACTERISTICS | | |
| --- | --- | --- | --- |
| | HARDWARE | SOFTWARE | OPERATIONAL |
| Medium (98.5 - 98.999%) | Economical; little or no hardware redundancy (e.g., stand-alone server(s)) | Nominal application and data integrity (e.g., functional and tested disaster recovery plan) | Minimal consideration for performance degradation (e.g., support and repair services (24-48 hour guaranteed MTTR)) |
| Medium-High (99.0 - 99.499%) | Provide continuous availability (e.g., fault-resistant processor booting) | Medium application and data integrity (e.g., application designed and developed to support fail over configuration) | Some consideration for performance degradation (e.g. support and repair services (12-24 hour guaranteed MTTR)) |
| High (99.5 - 99.949%) | Provide continuous availability (e.g., redundant servers) | High application and data integrity (e.g., test environment models production environment) | User-defined application performance (e.g., tested and documented MTTR scenarios) |
| Very High (99.95 - 99.989%) | Elimination, avoid or minimize unscheduled outages (e.g., no use of first or early release products) | High application and data integrity (e.g., load balancing across severs or processors) | User-defined application performance (e.g., pro-active support and repair services (2-6 hour guaranteed MTTR)) |
| Extremely High (99.99 - 99.999%) | Elimination, avoid or minimize unscheduled outages (e.g., multi-node parallel cluster) | High application and data integrity (e.g., system environment independence) | User-defined application performance (e.g., pro-active support and repair services (2-6 hour guaranteed MTTR)) |

FIG. 8

| APPLICATION AVAILABILITY LEVEL: MEDIUM (98.50 - 98.999 %) | | |
|---|---|---|
| Hardware Characteristics | Software Characteristics | Operational Characteristics |
| Stand-alone server(s) | Automatic procedures for starting and stopping application | Central administration and standard operational practices |
| Automatic server restart | Functional and tested disaster recovery plan | Planned and tested restart and recovery practices |
| Hot swap drives | Consistent software configuration when using multiple servers/locations | Effective change management procedures |
| RAID 1/5 disk technology | Effective production ready vaildation (PRV and user acceptance test (UAT) process | Well trained support staff (CSA/DBA/LSA) |
| Storage area network connectivity (i.e., EMC or other consolidated disk array) | Secure | Support and repair services (24-48 hour guaranteed MTTR) |
| ECC memory | Effective change management | Proactive event monitoring tools |
| UPS with generator backup | Application fail over strategies | Protected and audited system access |
| Reliable/tested backup procedures | Well trained/stable development staff | Proper and regimented backup practices |
| Network redundancy at user location | | Reliable/tested backup and recovery procedures |

FIG. 9

| APPLICATION AVAILABILITY LEVEL: MEDIUM HIGH (99.00 - 99.499%) | | |
|---|---|---|
| Hardware Characteristics | Software Characteristics | Operational Characteristics |
| Fault-resistant processor booting | Application designed and developed to support fail over configuration | Real-time alarming capability |
| Multiple CPU modules | Automatic diagnostics | Support and repair services (12-24 hour guaranteed MTTR) |
| Redundant disk interfaces | Automatic recovery | Phone/home capability/remote diagnostics |
| Redundant power supplies | Reliable replicated database | |
| Redundant cooling system | Proactive problem detection/analysis with resolution tracking | |
| Redundant communication interfaces with diverse connectivity | | |
| Redundant network components (diverse circuit routing) | | |
| Mirrored replicated disks | | |
| Consistent hardware configuration when suing multiple servers/locations | | |
| Geographic diversity with fail over capability | | |
| Hot swap system components (power, fans, I/O boards, CPU/Memory) | | |

FIG. 10

| APPLICATION AVAILABILITY LEVEL: HIGH (99.50 - 99.949 %) |||
| --- | --- | --- |
| Hardware Characteristics | Software Characteristics | Operational Characteristics |
| Redundant servers - Active/standby | Proactive capacity planning and monitoring | Proactive tuning |
| Redundant servers - active/active | Scalable | Proactive capacity planning |
| | Test environment models production environment | Proactive network management |
| | | Proactive problem management |
| | | Proactive support and repair services (6-12 hour guaranteed MTTR) |
| | | Predictive maintenance |
| | | Proactive fault management |
| | | Tested and documented mean time to repair (MTTR) scenarios |

FIG. 11

| APPLICATION AVAILABILITY LEVEL: VERY HIGH (99.95 - 99.989 %) |||
|---|---|---|
| Hardware Characteristics | Software Characteristics | Operational Characteristics |
| I/O board dynamic reconfiguration and alternate pathing | Load balancing across servers or processors | Proactive support and repair services (2-6 hour guaranteed MTTR) |
| CPU/Memory board dynamic reconfiguration | Batch cycle does not require application downtime | Spare parts on-site |
| Auto component failover | Elimination of untested software | |
| Auto component isolation (multiprocessor/memory modules/power supplies/LAN cards) | Threaded | |
| Domaining capabilities | Ability to bind processess to specific CPUs | |
| Pre-failurealerts for system components | Use of open standards based products where possible - no proprietary products ||
| Replacement/upgrade of hardware or components at end of product lifecycle | | |
| No use of first or early release products | | |

FIG. 12

| APPLICATION AVAILABILITY LEVEL: EXTREMELY HIGH (99.99 - 99.999 %) |||
|---|---|---|
| Hardware Characteristics | Software Characteristics | Operational Characteristics |
| Multi-node parallel cluster | Application designed and developed to support high availability configuration<br><br>System Environment Independence | Proactive support and repair services (2-6 hour guaranteed MTTR) |

| DEGREE OF IMPLEMENTATION | CHARACTERISTICS |
|---|---|
| 0 | Best practice is not available |
| 1 | Best Practice is fully implemented |
| 2 | Best practice is implemented with minor room for improvement |
| 3 | Best Practice is implemented, with moderate room for improvement |
| 4 | Best practice is implemented with major room for improvement or implementation of the best practice is actively in progress |
| 5 | Best Practice is applicable, but not implemented. |

FIG. 15

| FREQUENCY OF OCCURRENCE | FREQUENCY OF BEST PRACTICE OCCURRING OR THE FREQUENCY THAT THE BEST PRACTICE SHOULD BE REVIEWED OR PERFORMED |
|---|---|
| 0 | Will not occur |
| 1 | Extremely rare - unlikely to occur in a year |
| 2 | Rare - likely to occur once in a year |
| 3 | Possible - likely to occur no more than twice a year |
| 4 | Probable - likely to occur once a quarter |
| 5 | Frequent - Likely to occur on a regular basis, more frequently than once a quarter. |

FIG. 16

| BUSINESS IMPACT | CHARACTERISTICS |
|---|---|
| 0 | No user impact, low impact to IT support. No impact to the business in case of problem |
| 1 | No user impact, medium impact to IT support. No change to business effectiveness or efficiency. If a problem occurs, it may not need to be corrected and formal work-arounds will not be put in place.<br><br>• Economic impact is limited to IT opportunity costs, i.e. IT has to interrupt/delay other work to deal with the problem.<br><br>• Affects display of date information<br><br>• Creates minor nuisance<br><br>• Problems that are hidden from the user by fail over type systems, but require a level of effort for IT to correct<br><br>• "Business Impact 2" type problems - but the function or application will be eliminated in the near future. |
| 2 | No user impact, high impact to IT support. A problem could have an impact on the application operation, but is not evident to the customer or the end-user. This may include:<br><br>• Problems require significant work arounds and significant production support costs but the end user is not directly affected. The business does not experience any negative economic impact. Examples include: e.g. Vendor call outs, site visits, replacement or repair costs not already covered in maintenance agreements, etc.<br><br>• Performance issues where the capabilities of the system are being approached and no plan to increase the capabilities have been identified<br><br>• Problems require significant work around and increased production support costs; but the user/customer is not directly affected<br><br>• Problems that are hidden from the user by fail over type systems, but significant work by IT required to repair |

| BUSINESS IMPACT | CHARACTERISTICS |
|---|---|
| 3 | User have low impact. A problem could have an impact on the operations of the company, but not necessarily evident to the customer. May include business impact 4 situations for which contingencies can be easily deployed.<br><br>• Affects internal corporate functions which do not directly or indirectly affect the customer (e.g., internal training)<br><br>• Affects building services<br><br>• Causes minor costs<br><br>• Inefficiencies<br><br>• Occasional minor rework<br><br>• Delays revenue recognition or collection for minor amounts<br><br>• Problems that may be covered by a fail over type systems, but the user is without service until the fail over is completed. Fail over time is reasonable. |

FIG. 18

| 4 | Users have medium impact. Next to highest designation. This may include impacts from business impact 5 which have very limited scope or for which work-arounds/contingencies should be easily achieved. These might also include:<br><br>• Negotiation of user Service Level Agreements for the application<br>• Affects negotiation or delivery of new service<br>• Indirectly affects delivery of primary daily services to customers, for example:<br>• Affects security to sensitive areas<br>• Affects ability to perform repairs<br>• Affects services from suppliers<br>• Affects work force deployment<br>• Delays significant revenue recognition or collection<br>• Affects delivery of customer bills<br>• Affects transfer of lock-box funds<br>• Causes a significant cost to address, even after system corrected<br>• Rebilling customers<br>• Significant overtime due to poor scheduling<br>• Regulatory fines or sanctions<br>• Affects or delays rollout of new products and services<br>• Affects disaster recovery capability |
|---|---|

| | |
|---|---|
| 5 | Users have high impact. Higher designation because of the impact potential for a problem. These might include:<br><br>• Affects physical safety<br><br>• Affects all completion or delivery of primary daily services to customers<br><br>• Significantly affects current revenue recognition and collection ($M monthly). For example, collection of billing information (with consideration on the amount affected and whether a third party, like an IC, is involved).<br><br>• Affects revenue for external business entities<br><br>• For example, Banks' electronic funds transfers are incomplete or incorrect<br><br>• Creates significant negative press - violates FCC or PUC requirements, generates potential union issues, etc.<br><br>• Creates non-compliance with statute or law |

| BUSINESS RISK | PRODUCT OF RISK PROBABILITY AND BUSINESS IMPACT |
|---|---|
| Low | < 8 |
| Medium | $8 \geq risk > 16$ |
| High | $\geq 16$ |

FIG. 21

SYSTEM AND METHOD FOR EVALUATING THE PERFORMANCE OF A COMPUTER APPLICATION

CROSS-REFERENCE TO RELATED APPLICATIONS

This application is a continuation of copending U.S. patent application Ser. No. 09/997,394, filed Nov. 29, 2001, now abandoned, which is a continuation of U.S. patent application Ser. No. 09/813,691, filed Mar. 21, 2001, now abandoned.

BACKGROUND OF THE INVENTION

1. Field of Invention

The present invention relates generally to computer-implemented applications and, more particularly, to a system and method for evaluating the performance of a computer application, wherein the performance is measured in terms of availability.

2. Description of the Background

With more mission critical applications now being hosted as remote services, network service providers need to provide assurances of performance and availability to their customers. Regardless of network type, keeping a wide area network up and running at peak performance is essential to many businesses. Whether the traffic running on the network is an application, e-mail message, e-commerce transaction or streaming video, disruptions in the network can have dire consequences on any business that relies on an IT infrastructure for customer service or employee productivity.

Network service providers may provide such assurances in the form of a service level agreement (SLA). An SLA is a contract between a service provider and a customer that specifies measurable service parameters and outlines penalties to be imposed against the provider should the service level fall short of the agreed terms. An SLA may specify, for example, the percentage of time the service or application will be available, the number of users the application can serve simultaneously, or a specific performance benchmark to which actual performance will be periodically compared. Though initially offered only by telecommunications and Internet service providers, SLAs have grown in popularity to include the latest breed of service firms like Web hosting companies and application service providers (ASPs). Even IS departments in major enterprises have adopted the idea of writing an SLA so that services for their customers (i.e., users in other departments within the enterprise) can be measured, justified, and perhaps compared with those of outsourcing network providers. Aside from its customer service benefits, SLAs also help IT and network managers identify the infiastructure-level actions necessary to improve application availability.

Establishing suitable terms for an SLA requires a baseline of the network's capabilities. Likewise, monitoring the terms of an existing SLA requires an assessment of the network capabilities and performance metrics. The most common SLA metric is availability. Availability is simply the ratio of the time during which the application is operational to a selected elapsed time, or evaluation period. Availability is often quantified in terms of the number of "9"s. One "9" is 90%, two are 99%, three are 99.9%, and so on. For example, for an application to be available at 99.99 percent, a common figure for many metrics, the system can have an outage or disruption for 4.32 minutes per month. Adding one more "9" reduces the allowable downtime to less than six minutes per year.

SLAs, of course, encompass measurable, technical performance of network components but also less tangible business items that can affect end-to-end performance. To ensure consistent end-to-end performance, SLAs often include basic areas of operations and management such as backup schedules, software updates, systems monitoring and maintenance, and even security. An overall assessment of application availability, therefore, requires a combined evaluation of these technical and business items. Combining these items in a meaningful way, however, presents problems for providers and requires significant time and effort.

Assessing application availability for several applications on a consistent basis can create additional complexities, especially when the applications have different defined service levels. For example, a serious outage for a lower availability system might be 5 minutes per month while an equally serious outage for a high availability system might be 5 minutes per year. Thus, applying a fixed grading scale to both types of systems would yield unreasonable results for one or both types of systems.

A method and system is needed that enables service providers to evaluate the availability of an application implemented on a computer network. Such a system should have sufficient capability to determine how well an application performs versus an SLA or other defined service level. The system should also be capable of assessing the architectural capabilities of the application to provide a given service level. The system should be capable of identifying service failure points within the IT infiastructure and the application, which would allow network managers to develop risk mitigation plans to improve the ability of the application to meet a defined service level. Finally, the system should have sufficient flexibility to produce meaningful results for both high and lower availability systems.

SUMMARY OF THE INVENTION

The present invention is directed to a system for evaluating the performance of a computer-implemented application, wherein the performance is measured in terms of availability. According to one embodiment, The system includes a metrics data module comprising actual service level data, wherein the actual service level data can be used to determine an actual service level; a defined data module comprising defined service level data, wherein the defined service level data can be used to determine a defined service level; and a service level analysis module in communication with the metrics data module and the defined data module for calculating the actual service level and the defined service level and for comparing the actual service level to the defined service level using a grading scale defined as a function of the defined service level.

The system of the present invention may be used, for example, to evaluate the performance of an application against established service levels. For example, the present invention may be used in the provision of remote or local data and telecommunications services. Such services may be offered by, for example, web hosting companies, application service providers, Internet service providers, or even IS departments serving a large user community in major enterprises. For service providers with performance obligations with respect to application availability, the present invention may be employed to evaluate an application against a defined service level. For example, the present invention may also be used to evaluate the performance of an application against the capability of the application architecture and also to identify gaps and vulnerabilities in these levels.

Ultimately, the present invention may be used to provide recommendations to eliminate the gaps and vulnerabilities.

In addition to evaluating application performance against existing service level agreements, the present invention may be used to establish achievable defined service levels before entering into a service agreement or even before the construction of a system. For example, systems development organizations may use the present invention as a guide in the design and construction of systems to meet required business service levels prior to implementation.

These and other benefits of the present invention will be apparent from the detailed description below.

DESCRIPTION OF THE FIGURES

For the present invention to be understood clearly and readily practiced, the present invention will be described in conjunction with the following figures, wherein:

FIG. 4 is an exemplary application grading scale according to one embodiment of the present invention;

FIG. 8 is an exemplary tool for assessing the architectural capability of an application platform according to one embodiment of the present invention;

FIG. 9 through FIG. 13 are exemplary job aids for assessing the architectural capability of an application platform according to one embodiment of the present invention;

FIG. 15 is an exemplary scale for assessing the degree of implementation of an area of best practice according to one embodiment of the present invention;

FIG. 16 is an exemplary scale for assessing the frequency of occurrence of an area of best practice according to one embodiment of the present invention;

FIG. 17 through FIG. 20 is an exemplary scale for assessing business impact according to one embodiment of the present invention;

FIG. 21 is an exemplary scale for categorizing business risk according to one embodiment of the present invention;

DETAILED DESCRIPTION OF THE INVENTION

It is to be understood that the figures and descriptions of the present invention have been simplified to illustrate elements that are relevant for a clear understanding of the present invention while eliminating, for purposes of clarity, other elements. For example, certain system architecture details, such as certain details of the hardware, software, and operational characteristics, are not described herein. Those of ordinary skill in the art will recognize, however, that these characteristics are conventional. A discussion of such elements is not provided because such elements are well known in the art and because they do not facilitate a better understanding of the present invention.

Figure 1:
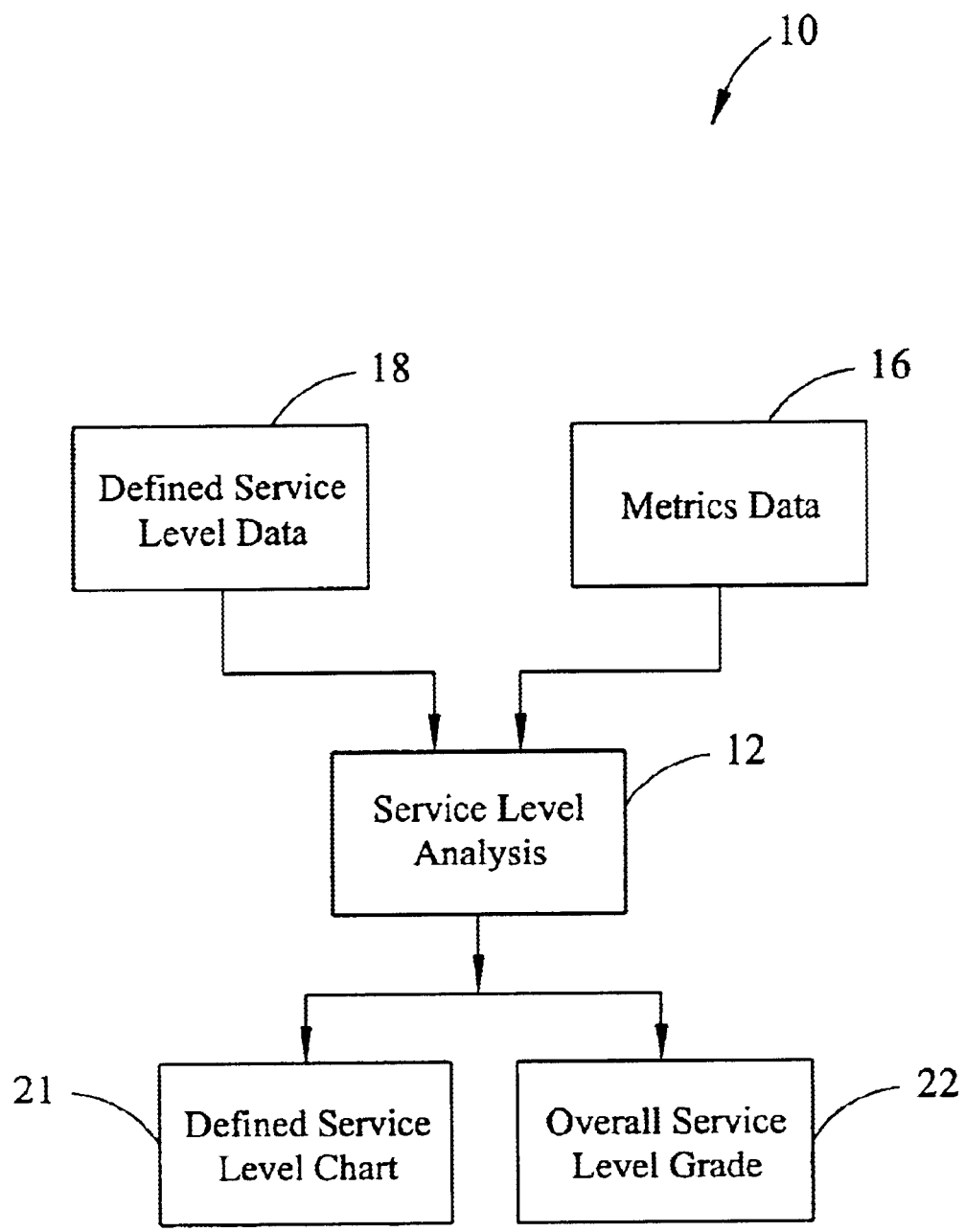
FIG. 1 is a block diagram of an exemplary application assessment system according to one embodiment of the present invention.
Figure 2:
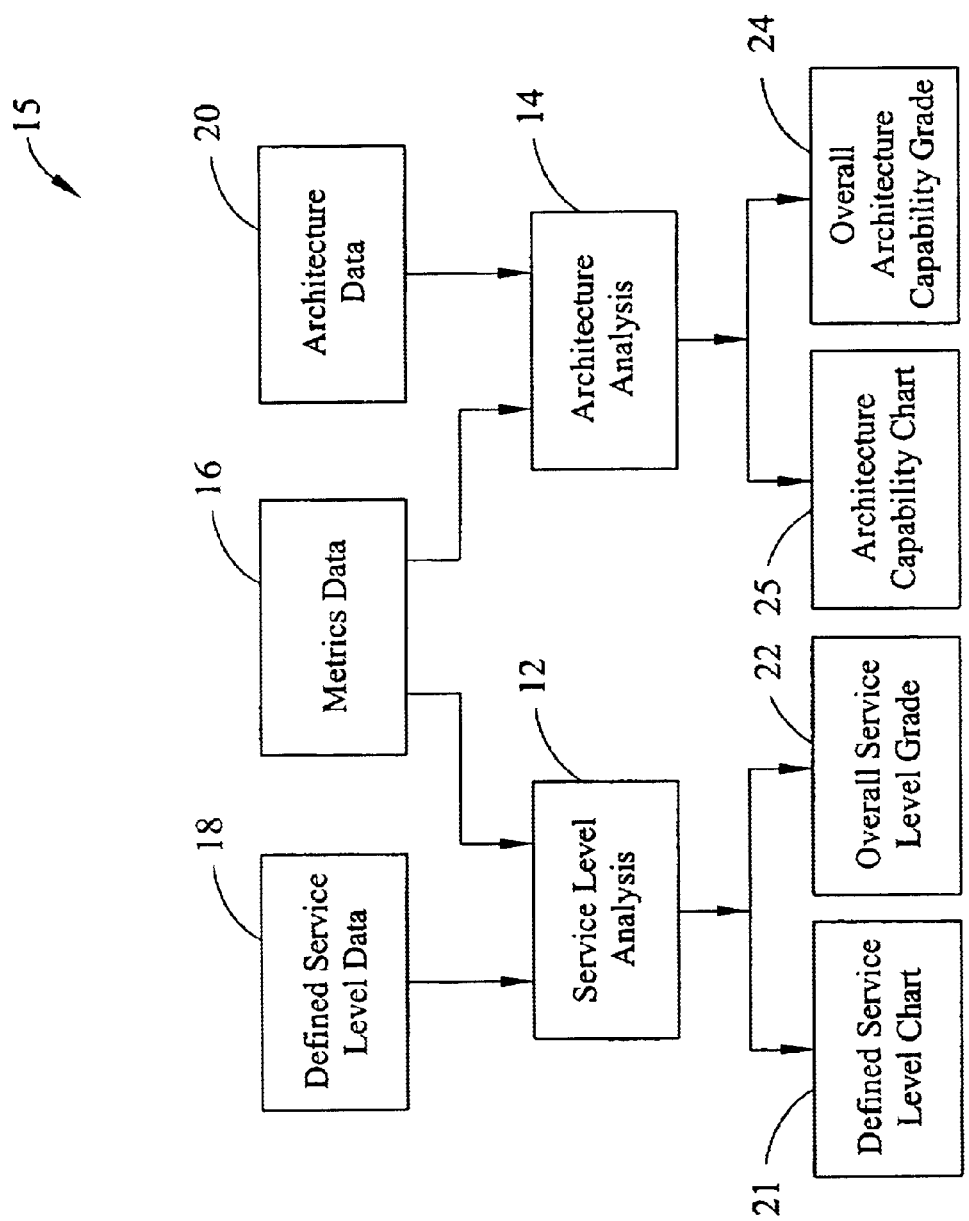
FIG. 2 is a block diagram of an exemplary application assessment system according to another embodiment of the present invention.

FIG. 1 is an exemplary block diagram of a system 10 according to one embodiment of the present invention for assessing the performance of a computer-implemented application. The system 10 includes a service level analysis module 12 that receives input from data modules 16 and 18. The service level module 12 outputs a defined service level chart 21 and a service level grade 22. According to another embodiment, FIG. 2 shows an exemplary block diagram of a system 15 with additional capability for assessing the performance of a computer-implemented application. The system 15 includes, in addition to the service level analysis module 12, an architecture analysis module 14 that receives input from the data modules 16, 18, 20. The service level module 12 outputs the service level grade 22 and the defined service level chart 21. Similarly, the architecture analysis module 14 outputs an architecture capability grade 24 and an architecture capability chart 25. These modules are described in greater detail below.

Systems 10 and 15 may be implemented on an intelligent platform such as, for example, a computer, such as a workstation or a personal computer, a microprocessor, a network server, or an application specific integrated circuit, using any suitable type of computer instruction. It will be appreciated, however, that the invention can be implemented at any level, ranging from hardware to application software. According to one embodiment, the systems 10, 15 may be implemented as software code to be executed using any suitable computer language such as, for example, Visual Basic, Java, C or C++ using, for example, conventional or object-oriented techniques. The software code may be stored as a series of instructions or commands on a computer readable medium, such as random access memory (RAM), read only memory (ROM), a magnetic medium such as a hard-dive or a floppy disk, or an optical medium such as CD-ROM. According to another embodiment, modules 12 and 14 reside on separate physical devices.

Metrics data module 16 may include actual service level data such as measurements of a particular characteristic of the performance or efficiency of a computer program for calculating application availability, such as end-to-end availability. Metrics data module 16 may include any information necessary to identify the business impact of the application performance. For example, metrics data module 16 may include availability data, response time statistics, outage statistics classified by cause codes, Receipt to Repair (RTR) statistics, or Mean Time to Restore (MTR) statistics. Availability data may be derived, for example, from the same data normally collected for response time metrics. In a system that performs and records time response measurements periodically, such as hourly, any timeouts may be associated with, for example, a non-responsive infrastructure component or any other cause. Thus, the data necessary to develop an outage history may be contained in a performance database.

The defined data module 18 may include defined service level data such as a defined set of measurable standards of performance. Measurable standards may include, for example, the percentage of time the service or application will be available, the number of users the application can serve simultaneously, or a specific performance benchmark to which actual performance will be periodically compared. Defined data may arise from, for example, external SLAs, IT SLAs, hardware/software maintenance agreements, licensing agreements, or even customer expectations.

Architecture data module 20 may include data describing the combined system architecture for the computer information system platform upon which the application is executed. System architecture, as used herein, encompasses not only processing hardware and software, but also application software and communications infrastructure or end-systems as appropriate. This includes, for example, the hardware platform, peripherals, operating system, application software, middleware, database software, and communications hardware and software. According to one embodiment, the architectural characteristics of a system may be categorized by hardware, software, and operational characteristics. Hardware characteristics may include, for example, the basic components of an economical system, such as an uninterrupted power supply (UPS) with generator backup or, in a high availability system, a redundant server. Software characteristics may include, for example, software for balancing loads across servers or processors or for binding processors to specific CPUs. Finally, operational characteristics may include, for example, backup practices or support staff availability.

Service providers may assess the architecture capability of an application platform by analyzing the specifications for each system subcomponent that may affect system resiliency. Combining this information to determine an overall architecture capability for the system may require a substantial commitment of resources because of the large number of components and subcomponents in some systems. The present invention employs a less rigorous approach in which the architecture data in module 20 contains certain system characteristics by availability category. According to one embodiment, the system characteristics may be classified into categories where each category is indicative of a certain level of service. The purpose is to classify the architecture into a category indicative of its ability to provide service. According to one embodiment, the system architecture assigned to a given category should meet or exceed the service level indicative of that category.

Figure 3:
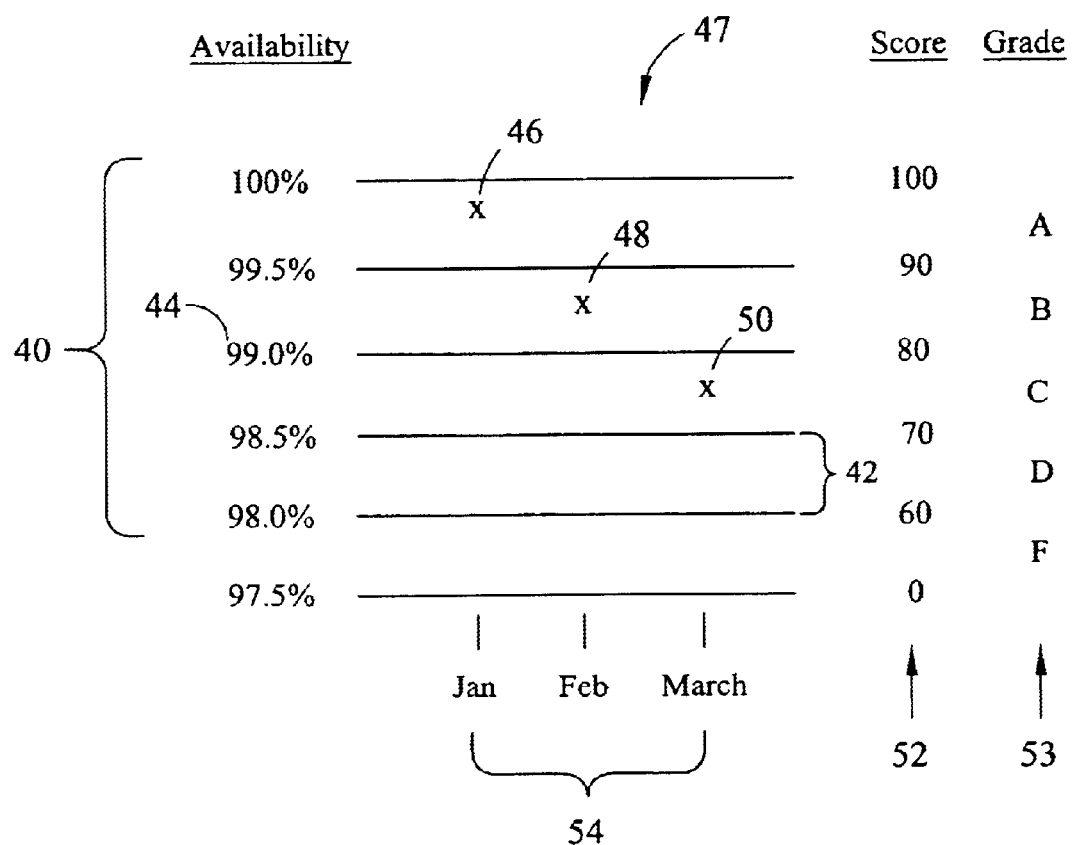
FIG. 3 is a diagrammatic representation of an exemplary availability spectrum and an associated uniform scoring spectrum.

Service level analysis module 12 compares the metrics data 16, or actual service level data, with the defined service level data 18 to evaluate the performance of an application relative to its defined service level. The service level analysis module 12 may, for example, evaluate the application performance using a grading system defined as a function of the defined service level. FIG. 3 shows a schematic diagram 47 in which service level module 12 divides an availability spectrum 40 into, for example, five bands 42 where each band consumes an equal part of the availability spectrum 40. By defining the size of the bands as a function of the defined service level 44, the resolution of the spectrum 40 conveniently adjusts for evaluating applications with different defined service levels.

The size of the bands 42 may be defined by, for example, a constant defined as a function of the defined service level 44. According to one embodiment, the constant is $$\Delta \equiv \frac{100 - DFL}{2}$$

where DFL is the defined service level 44, expressed as a percentage. Schematic 47 contains sample metrics data 46, 48, 50 for a hypothetical application. For the defined service level 44 of 99.0%, the size of the bands 42 is equal to 0.5% in terms of availability. For reasons that will become clear later, the bands may be arranged along the availability spectrum so that, according to this embodiment, two bands describe the spectrum above the defined service level and three bands describe the spectrum below the defined service level. The bands may define, for example, a traditional grading spectrum where the top-level band, 99.5 to 100.0% in this example, represents a grade of "A," 99 to 99.5% represents a grade of "B," 98.5 to 99% a grade of "C," 98 to 98.5% a grade of "D," and below 98% a grade of "F." FIG. 4 shows a table 56 illustrating an exemplary application grading scale according to such an embodiment. According to such an embodiment, the scale assigns an A or B for meeting or exceeding the service level, and assigns a C or worse for failing to meet the service level.

The service level module 12 may also calculate the application availability according to techniques known to those skilled in the art, for each defined service interval. For example, FIG. 3 shows the availability for a hypothetical application with the defined service level 44 running from January through March. According to the example, the average service level for January 46 falls into the top-level band, which represents a grade of "A." Similarly, the February service level 48 and March service level 50 fall into bands two and three, representing grades of "B" and "C" respectively.

The service level module 12 may also define a corresponding numerical scoring spectrum 52 for translating, for example, the actual service levels 46, 48, 50 into scores. According to one embodiment, shown in FIG. 3, service level module 12 defines a scoring spectrum 52 having uniform bands. According to such an embodiment, each band encompasses an equal number of scores, such as 10 points per band. For example, the top-level band or "A" band may encompass scores between 90 and 100. Similarly, the "B" band may encompass scores between 80 and 90, the "C" band between 70 and 80, the "D" band between 60 and 70, and the "F" band below 60.

Figure 5:
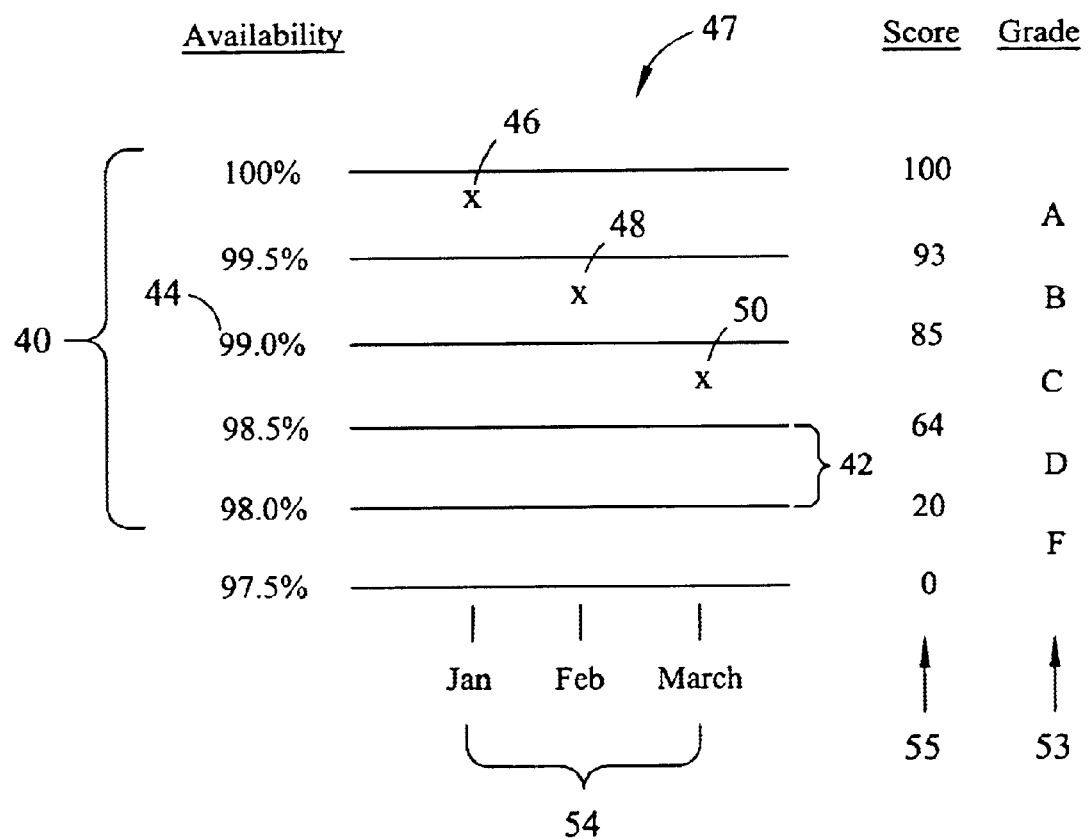
FIG. 5 is a diagrammatic representation of an exemplary availability spectrum and an associated non-uniform scoring spectrum.

According to another embodiment, the service level module 12 may define a non-uniform scoring band 55. According to such an embodiment, each band may encompass, for example, varying ranges of scores. For example, FIG. 5 shows the top-level band or "A" band may encompass scores between 93 and 100. Similarly, the "B" band may encompass scores between 85 and 92, the "C" band between 64 and 84, the "D" band between 20 and 63, and the "F" band below 20. Referring to FIG. 5, the February service level 48 equal to 99.25% becomes, by interpolation, a score of 89. Defining the scoring spectrum in this fashion emphasizes actual service levels that fall below the defined service level. For example, where a score of 84 on a uniform scoring spectrum would yield a grade of "B," the same score on a non-uniform spectrum, such as non-uniform scoring spectrum 52, would yield a grade of "C." A non-uniform scoring band can also emphasize lower grades by preventing high grades from offsetting low ones.

The service level module 12 may also emphasize actual service levels that fall short of the defined service level 44 by arranging spectrums 40 and 52 (or 55), so that a defined service level is a boundary between a grade of "B" and "C." According to this embodiment, applications that just meet the defined service level will receive a grade of "B−." If the application misses the service level target for one month, for example, the grade will drop below the B range. Emphasizing substandard service levels, in turn, highlights those aspects of the system in need of infrastructure improvements.

Service level module 12 may also calculate an overall service level score for the evaluation period 54 based on, for example, the arithmetic average of the scores. According to the non-uniform scoring spectrum 52, for example, the actual service levels 46, 48, 50 for January, February and March would yield scores of 96.5, 89, and 74.5, by interpolation. The average service level over the evaluation period becomes 86.7, based on the arithmetic average of the monthly scores. An average service level score of 86.7, according to this embodiment, corresponds to an overall service level grade of "B" over the evaluation period 54.

Figure 6:
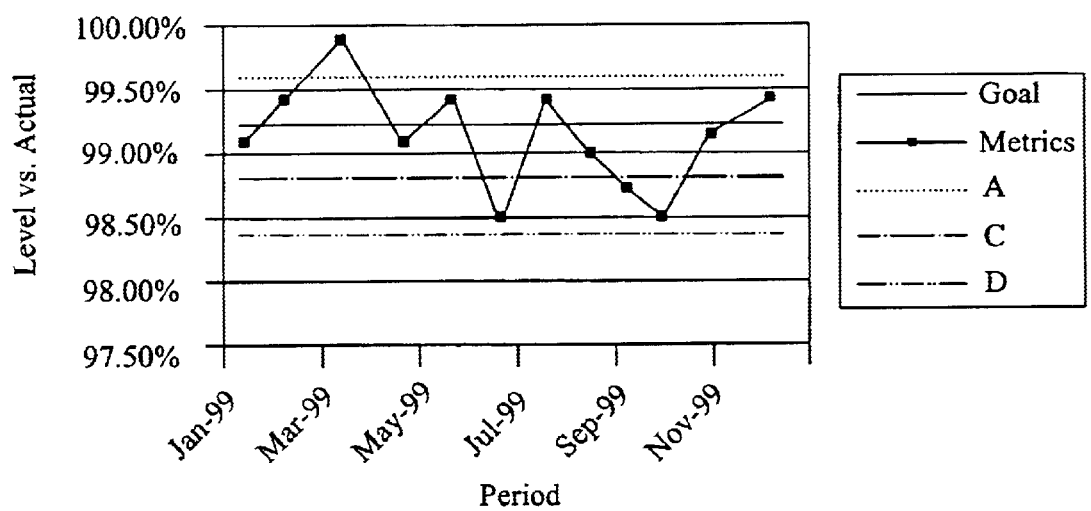

In addition to the overall service level grade 22, the service level analysis module 12 also outputs the defined service level chart 21. FIG. 6 shows an exemplary defined service level chart 21 according to one embodiment of the present invention. The chart 21 compares the metrics data for a hypothetical application with the defined service level or "goal," shown here as approximately 99.25%. The chart 21 also illustrates, in part, the various grading bands 53, shown here using various broken lines.

Figure 7:
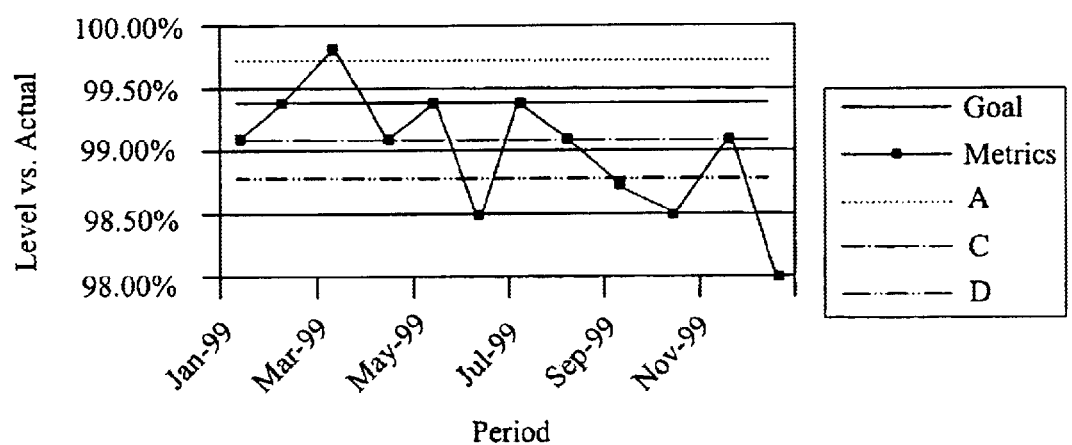
FIG. 7 is an exemplary diagram according to one embodiment of the present invention for comparing the metrics with the capability of the architecture to deliver service.

The architecture analysis module 14, as shown in FIG. 2, receives input from the metrics data module 16 and the architecture data module 20 and outputs a grade 24 and an architecture capabilities chart 25. A low architecture grade 24 may indicate, for example, that the defined service level exceeds the capability of the system architecture. This result suggests that either the defined service level should be lowered in accordance with the system architecture or the system architecture must be upgraded. The architecture analysis module 14 also outputs the capabilities chart 25 that shows historical performance, architecture capability, and a defined service level, all in terms of availability. For simplicity, historical data should be compiled according to the same time period stated in the defined service level agreement. For example, if an SLA stipulates availability on a monthly basis, historical data should be compiled on a monthly basis. FIG. 7 shows an exemplary chart 25 according to one embodiment of the present invention. Like chart 21, chart 25 compares the metrics data for a hypothetical application with the architecture capability or "goal" for a hypothetical system, shown here as approximately 99.4%. Chart 25 also illustrates, in part, the various grading bands 53, shown here using various broken lines.

The architecture analysis module 14 may designate the overall architectural capability band for the system as, for example, the lowest availability level that a pre-determined percentage of all system architecture characteristics can support. For example, most, if not all, of all system characteristics assigned to a service level category of 9.09–99.5% should be capable of supporting this level of service. According to one embodiment of the present invention, the architecture analysis module 14 divides the availability spectrum according to, for example, the availability spectrum 40, where each band corresponds to a service level category defined in the architecture data module 20. According to such an embodiment, module 14 categorizes certain system characteristics into one of the five bands.

The architecture analysis module 14 may also define each band in terms of system architecture characteristics. For example, in FIG. 8, table 56 describes, in general terms, the typical or model system characteristics for supporting a given level of application availability. Those skilled in the art will appreciate that certain combinations of system architecture characteristics may be necessary to achieve certain levels of availability. For example, these characteristics may be grouped by availability level according to the highest level of availability the characteristic can support. In particular, FIG. 9 through FIG. 13 show, for each level of availability, a list of the characteristics, organized by hardware, software, and operation, that may be necessary to achieve a given level of availability.

To assess the architectural capability of a system architecture 17, the characteristics of the system 17 may be compared to the model hardware, software, and operational characteristics for a "medium" availability system, as shown in FIG. 9. If the system 17 exhibits, for example, 80% of the characteristics for the model medium availability system, the system 17 is then compared to characteristics for a model "medium-high" availability system, as shown in FIG. 10. If the system 17 exhibits, for example, 80% of the characteristics for medium-high availability, the assessment continues by comparing the system 17 to the model characteristics for a "high" availability system. This process continues until the system 17 does not exhibit, for example, 80% of the model characteristics for a given availability level. Specifically, if the system 17 exhibits 80% of the medium characteristics but not 80% of the medium-high characteristics, for example, the architectural capability of system 17 may be deemed capable of supporting only a "medium" level of application availability. In general, the architectural capability of a certain system corresponds to the highest availability level for which the system satisfies a predetermined percentage of the model characteristics.

For simplicity, FIG. 10 through FIG. 13 list only those system characteristics beyond those typically necessary to support a lower availability level. For example, the hardware characteristics for a medium-high availability platform shown in FIG. 10 include, for example, the stand-alone servers shown for a medium availability system.

After selecting the availability band representative of the architecture capability, the architectural analysis module 14 may designate a specific architectural capability, rather than a range. While some system characteristics have a quantifiable impact on application availability, others may only be identified as a range. Specifically, module 14 may combine the system characteristics, whether specified as a range or a specific value, into a specific value that represents the overall architectural capability of the system. According to one embodiment, module 14 may designate the midpoint of an appropriate band as the overall architectural capability (e.g. 98.25 for the 98.0–98.5 band). According to another embodiment, module 14 may calculate an overall architectural capability by averaging system characteristics according to the midpoint of each band.

Figure 14:
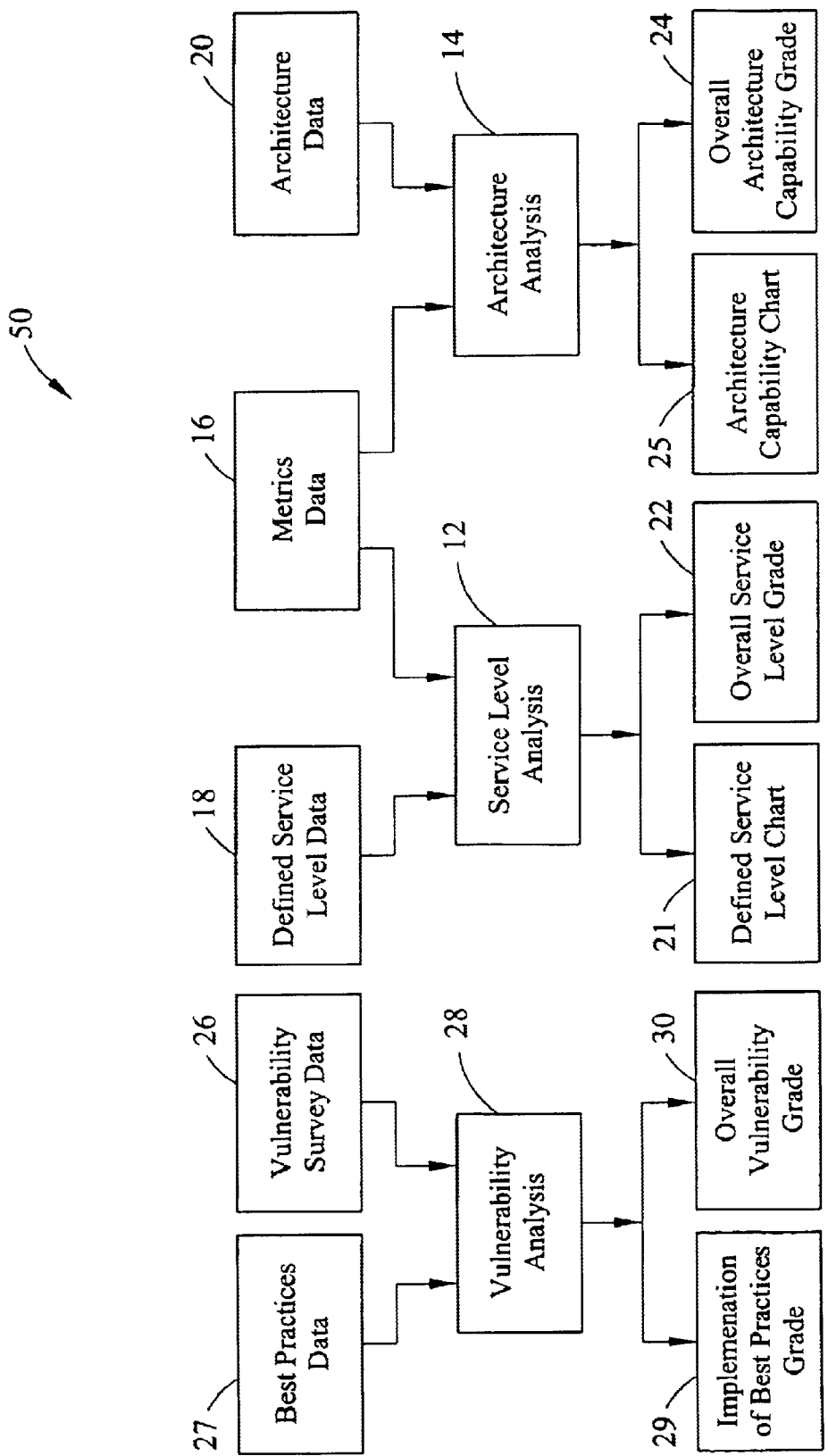
FIG. 14 is a block diagram of an exemplary application assessment system according to one embodiment of the present invention.

According to another embodiment, FIG. 14 shows a system 50 that includes a vulnerabilities analysis module 28 for evaluating business risk associated with the implementation and operation of an application. Vulnerabilities module 28 receives vulnerability survey data 26 and best practices data 27 and outputs an implementation of best practices grade 29 and a vulnerability grade 30.

The vulnerabilities survey data module 26 may include information collected from a survey distributed to a diverse group of individuals having cognizance of various aspects of the application and the associated system architecture. The groups may include personnel from application support, operations, system administration, transport, infiastructure, or even end-users. The survey may, for example, pose questions concerning the extent to which an application implements various areas of best practices. Those skilled in the art will appreciate that the areas of best practice may include, for example, standards published by industry groups, such as the Meta Group, the Gartner Group, or some modification thereof. The best practices survey may include questions that address a variety of functional areas such as internal and external service agreements, architecture, application performance, systems/network management, processes and procedures, business continuity/disaster recovery, and security.

The survey questions may, for example, evaluate the degree of implementation (DI) of various areas of best practice for the application. According to one embodiment, the survey may limit the responses to a set of numerical values that indicate the degree to which the application has implemented each area of best practice. FIG. 15 shows a table 70 that illustrates an exemplary numerical scale for representing the degrees of implementation according to such an embodiment. In addition to numerical responses, the vulnerability data may include an explanation for each question that provides the basis for the answer. The vulnerability analysis module 28 may also calculate the best practices grade 29. According to one embodiment, best practices grade 29 is equal to an average of the DI scores for each area of best practice. A grade of "A+" may be assigned where the provider has fully implemented an area of best practice, i.e. a degree of implementation equal to 1. In this instance, an "A+" is an appropriate grade because the provider can do no more to protect against the failure for which the fully implemented best practice area was designed to prevent.

The vulnerability survey may also include frequency of occurrence questions to determine how often the best practice occurs or how often it should occur. For example, a frequency of occurrence (FO) survey question may ask how often the provider reviews existing service level agreements. FIG. 16 shows a table 72 that illustrates an exemplary 0 to 5 scale for quantifying the responses. For example, if existing service level agreements are reviewed once per year, the survey respondent would enter a "2," as a response to the survey question.

The vulnerability survey may also include, for each best practice area, questions to measure the business impact (BI) of an adverse event, should that event occur. The business impact may include, for example, economic and productivity impacts if the problem occurs. The magnitude of the business impact may be influenced by, for example, its visibility (i.e., whether the end-user or customer experiences the problem). Like the degree of implementation (DI) and the frequency of occurrence (FO), the business impact may be described using a scale from 0 to 5. FIG. 17 though FIG. 20 show a table 74 that contains an exemplary scale for measuring business impact according to such an embodiment. According to such a scale, 0 to 2 may refer to events that could cause problems that should not affect the end user or customer (i.e., IT issues only). A business impact of 3 to 5 may refer to events that affect the user.

The vulnerabilities module 28 may combine the degree of implementation, frequency of occurrence, and business impact data for each survey question, for each functional area, and for the overall survey. First, vulnerabilities module 28 calculates a business risk (BR) for each survey item by evaluating the frequency that the risk occurs (FO) and the business impact (BI) if the risk does occur. The business risk (BR) may be determined, for example, by multiplying the frequency of the occurrence of a given best practice area (FO) by the business impact (BI). The resulting business risk (BR) may then be categorized qualitatively using categories such as high, medium, or low. FIG. 21 shows a table 76 that illustrates one embodiment of a scale for categorizing the business risk. According to such an embodiment, items identified as low business risk may be a matter of inconvenience. Items identified with a business risk of medium or high, however, may indicate potential service failure points within the application. For example, if a failure results in additional costs for the service provider or the service provider's customers (e.g., a customer cannot execute online orders), even if it occurs just once per year, the business risk may be categorized as medium or high.

The vulnerabilities analysis module 28 may combine the business risk (BR) with the degree of implementation (DI) for each best practice area to arrive at a grade, which indicates how well an application is positioned to minimize its vulnerabilities. According to one embodiment, vulnerability analysis module 28 determines a vulnerability score, for each best practice area i as:

$$V_i \equiv \frac{100 - \left((DI_i - 1) * 4 * \frac{BR_i}{x_i}\right)}{100}$$

where $DI_i$=degree of implementation for best practice area i $BR_i=BI_i*FO_i$=business risk for best practice area i $x_i$=qualitative assessment of business risk according to table 76 where $x_i$ is 5 when $BR_i$ is high, 3 when $BR_i$ is medium, and I when BR is low.

Before evaluating the above equation, two special tests may be performed. First, vulnerability analysis module 28 tests whether DI is 0 (i.e., not applicable). If DI=0, the score, $V_i$, is not calculated for that best practice area. Second, a grade of "F" may be a special case where DI, FO, and BI all equal five. An application would receive an "F" if, for example, the application does not protect itself against a revenue impacting item that happens more than once per quarter. In this case, module 28 assigns a score, $V_i$, of zero. After calculating a vulnerability score for each area of best practice, $V_i$, module 28 translates each score into a grade. According to one embodiment, module 28 translates the scores into grades according to scoring spectrum 52.

The vulnerability analysis module 28 may combine all the vulnerability grades, $V_i$, to determine an overall vulnerability grade 30 for the application. According to one embodiment, all of the grades are averaged together to determine the overall vulnerability grade. Using this approach, however, failures may become overshadowed by successes. For example, implementing 190 of 208 areas of best practice may overshadow the 18 problem areas. According to another embodiment that addresses this issue, all grades of "B" receive one point, all grades of "C" receive two points, all grades of "D" receive three points, and all grades of "F" receive six points. All grades of "A" may be eliminated because an "A" is not a vulnerability. Using a grade of "D" as a baseline, the total vulnerability score is $$S_{vid} = \frac{3N_{ques} - \sum_{i=1}^{N_{ques}} V_i}{3N_{ques}}$$

where
- $N_{ques}$=number of questions answered in the vulnerability survey;
- $V_i$=number of points assigned to survey question i (e.g. 1 for a "B," 2 for a "C").

For an application assigned a grade of "D" for each area of best practice, for example, the total vulnerability score would be zero.

In practice, the service level, architecture, and vulnerability scores may be analyzed in a gap analysis phase to prepare risk mitigation strategies, such as architecture upgrades or service level adjustments. The gap analysis phase is designed to identify areas of improvement by comparing the application service levels to the metrics and the vulnerability survey data. The gap analysis may include a service level gap analysis that compares the actual service level with both the defined service level and with the architecture designed service level. Examining the alignment of user service agreements, major provider service level agreements, and hardware/software maintenance agreements may also identify service gaps.

Figure 22:
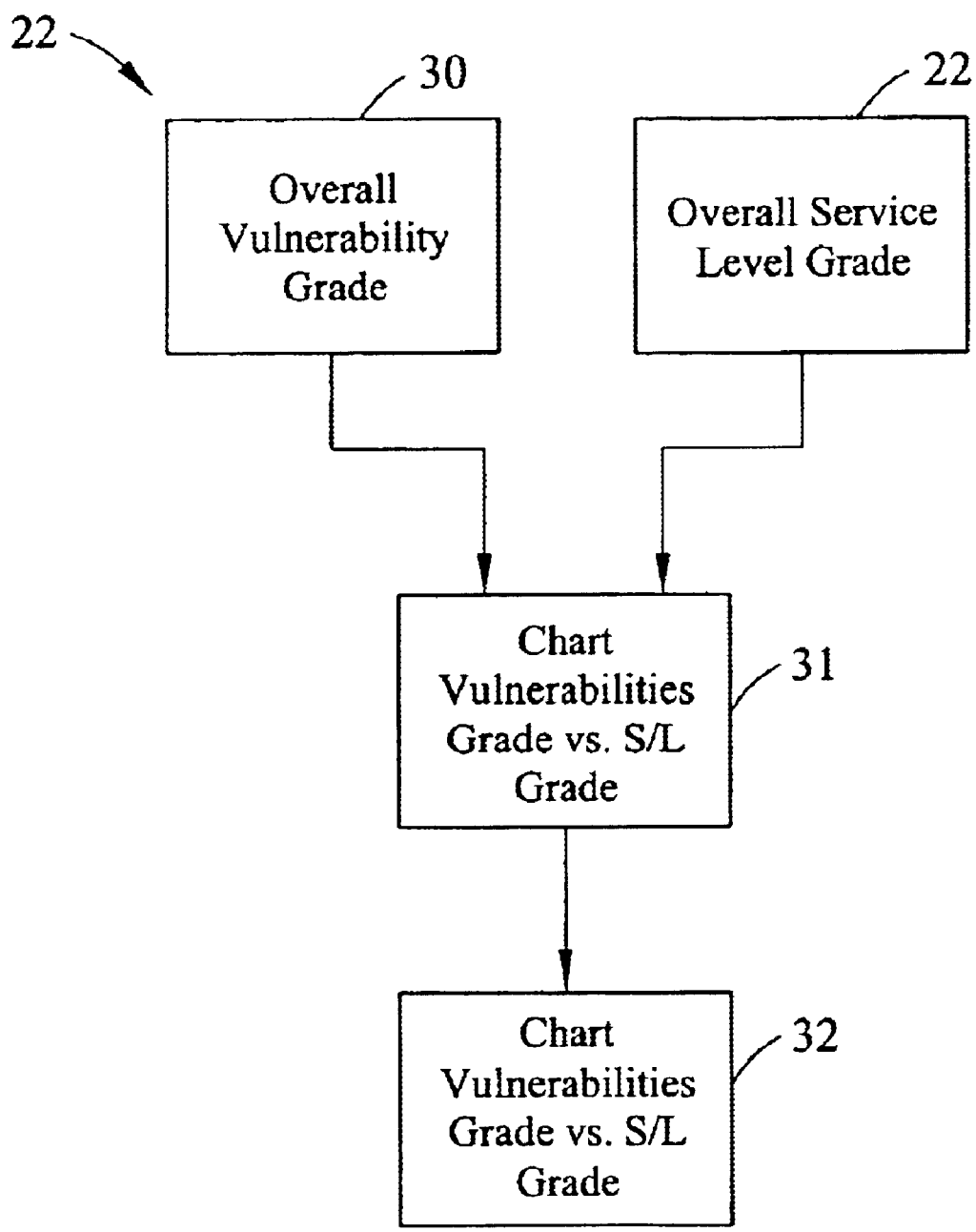
FIG. 22 is a block diagram of an exemplary system for displaying results according to one embodiment of the present invention.
Figure 23:
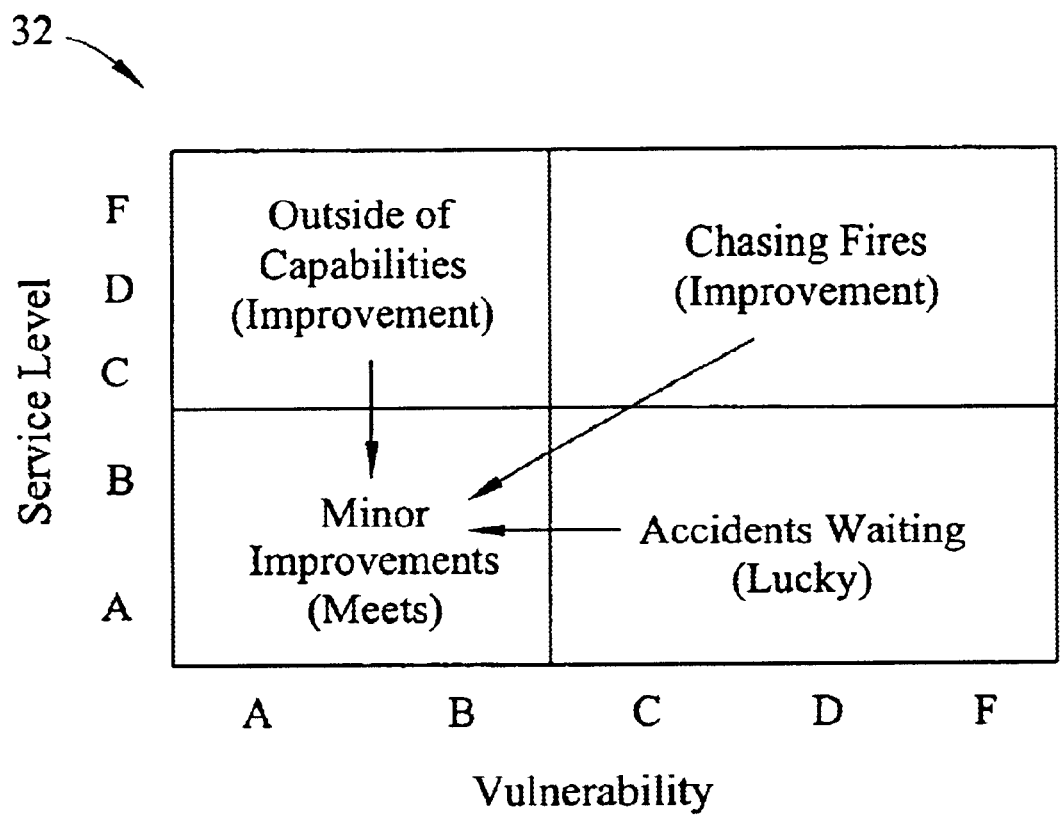
FIG. 23 is an exemplary executive overview graph illustrating the results of the application assessment.

FIG. 22 is a block diagram of system 62 for combining the vulnerability grade 30 and the service level grade 22 in a simple and convenient visual format according to one embodiment of the present invention. The system 62 includes a display module 31 that receives the vulnerability grade 30 and the service level grade 22 as input and outputs a chart 32. The chart 32, illustrated in FIG. 23, shows an example of an executive overview graph in which each quadrant represents certain broad assessments of the application. Chart 32 may also be used to compare several applications simultaneously.

It should be understood that the invention is not limited by the foregoing description of preferred embodiments, but embraces all such alterations, modifications, and variations in accordance with the spirit and scope of the appended claims.

What is claimed is:

1. A system for evaluating the performance of a computer-implemented application, wherein the performance is measured in terms of availability, comprising:
   - a metrics data module including actual service level data, wherein the actual service level data can be used to determine an actual service level;
   - a defined data module including defined service level data, wherein the defined service level data can be used to determine a defined service level; and
   - a service level analysis module in communication with the metrics data module and the defined data module for calculating the actual service level and the defined service level and for comparing the actual service level to the defined service level using a grading scale defined as a function of the defined service level, wherein the grading scale comprises:
      - an availability spectrum having a top and a bottom, wherein the defined service level is between the top and the bottom, and wherein the availability spectrum is divided into a plurality of bands having boundaries defined by breakpoints, and wherein the bands have a width defined as a function of the defined service level;
      - a numerical scoring spectrum, wherein the scoring spectrum has a top and a bottom, wherein the top of the scoring spectrum corresponds to the top of the availability spectrum, and wherein the scoring spectrum is divided into a plurality of bands, and wherein the boundaries of the bands are defined by breakpoints, and wherein the breakpoints of the scoring spectrum correspond to the breakpoints of the availability spectrum; and
      - an interpolation module for translating an actual service level into a service level score, wherein the interpolation module interpolates between the availability spectrum and the scoring spectrum.

2. The system of claim 1, wherein the scoring spectrum is defined by a plurality of non-uniform bands.

3. The system of claim 1, wherein the scoring spectrum is defined by a plurality of uniform bands.

4. The system of claims 1, wherein the availability and scoring spectrums have four breakpoints defining five bands.

5. The system of claim 4, wherein two of the bands are situated above the defined service level and three bands are situation below the defined service level.

6. The system of claim 1, wherein the overall service level grade is the grade associated with the band that encompasses the average of the service level scores over an evaluation period.

7. A system for evaluating the performance of a computer-implemented application, wherein the performance is measured in terms of availability, comprising:
   - a metrics data module including actual service level data, wherein the actual service level data can be used to determine an actual service level;
   - a defined data module including defined service level data, wherein the defined service level data can be used to determine a defined service level;
   - a service level analysis module in communication with the metrics data module and the defined data module for calculating the actual service level and the defined service level and for comparing the actual service level to the defined service level using a grading scale defined as a function of the defined service level;
   - an architecture data module comprising architecture data, wherein the architecture data can be used to determine an architecture designed service level in terms of application availability; and
   - an architecture analysis module in communication with the architecture data module and the metrics data module for calculating the architecture designed service level and for calculating an overall architecture capabilities grade for the application by comparing the architecture designed service level to the defined service level.

8. The system of claim 7, wherein the architecture analysis module is also for developing an architecture capability chart, and wherein the architecture capability chart shows historical performance, an architecture capability, and a defined service level, all in terms of availability.

9. The system of claim 7, wherein the architecture data module contains a plurality of system characteristics arranged by category, wherein each category is defined by an availability spectrum band, and wherein each system characteristic is categorized according to the lowest availability level that the system characteristic can support.

10. The system of claim 9, wherein the architecture analysis module determines an overall architecture capability equal to the lowest availability band that all system characteristics can support.

11. The system of claim 9, wherein the overall architecture capability is equal to the lowest availability band that at least 80 percent of all system characteristics can support.

12. A system for evaluating the performance of a computer-implemented application, wherein the performance is measured in terms of availability, comprising:
   a metrics data module including actual service level data, wherein the actual service level data can be used to determine an actual service level;
   a defined data module including defined service level data, wherein the defined service level data can be used to determine a defined service level;
   a service level analysis module in communication with the metrics data module and the defined data module for calculating the actual service level and the defined service level and for comparing the actual service level to the defined service level using a grading scale defined as a function of the defined service level;
   a best practices data module defining a plurality of areas of best practice, wherein each area of best practice is designed to guard against a certain problem;
   a vulnerability data module defining application vulnerability data; and
   a vulnerability analysis module, in communication with the vulnerability data module and the best practices data module, for calculating an overall vulnerability grade for the application and an implementation of best practices grade.

13. The system of claim 12, wherein the vulnerability data module comprises:
   degree of implementation data for the areas of best practice;
   frequency of occurrence data defining the frequency to which best practices occur; and
   business impact data defining the potential economic and productivity impact should the problem occur.

14. The system of claim 13, wherein the vulnerability analysis module includes:
   a business risk module for determining business risk for each practice area, wherein the business risk is the product of the frequency of occurrence of the best practice area and the business impact; and
   a vulnerability scoring module for determining an overall vulnerability score, wherein the vulnerability score is a function of the degree of implementation and the business risk for each area of best practice.

15. A method for evaluating the performance of a computer-implemented application, wherein the performance is measured in terms of availability, comprising:
   collecting actual service level data, wherein the actual service level data can be used to determine an actual service level in terms of application availability;
   collecting defined service level data, wherein the defined service level data can be used to determine a defined service level in terms of application availability;
   calculating an actual service level in terms of application availability;
   calculating a defined service level in terms of application availability; and
   comparing the actual service level to the defined service level using a grading scale defined as a function of the defined service level, wherein the grading system comprises:
      defining an availability spectrum having a top and a bottom, wherein the defined service level is between the top and the bottom, and wherein the availability spectrum is divided into a plurality of bands having boundaries defined by breakpoints, and wherein the bands have a width defined as a function of the defined service level;
      defining a numerical scoring spectrum, wherein the scoring spectrum has a top and a bottom, wherein the top of the scoring spectrum corresponds to the top of the availability spectrum, and wherein the scoring spectrum is divided into a plurality of bands, and wherein the boundaries of the bands are defined by breakpoints, and wherein the breakpoints of the scoring spectrum correspond to the breakpoints of the availability spectrum; and
      translating an actual service level into a service level score by interpolating between the availability spectrum and the scoring spectrum.

16. The method of claim 15, wherein the scoring spectrum is defined by a plurality of non-uniform bands.

17. The method of claim 15, wherein the scoring spectrum is defined by a plurality of uniform bands.

18. The method of claim 15, wherein the availability and scoring spectrums have four breakpoints defining five bands.

19. The method of claim 18, wherein two of the bands are situated above the defined service level and three bands are situation below the defined service level.

20. The method of claim 15, wherein the overall service level grade is the grade associated with the band that encompasses the average of the service level scores over an evaluation period.

21. A method for evaluating the performance of a computer-implemented application, wherein the performance is measured in terms of availability, comprising:
   collecting actual service level data, wherein the actual service level data can be used to determine an actual service level in terms of application availability;
   collecting defined service level data, wherein the defined service level data can be used to determine a defined service level in terms of application availability;
   calculating an actual service level in terms of application availability;
   calculating a defined service level in terms of application availability;
   comparing the actual service level to the defined service level using a grading scale defined as a function of the defined service level;
   collecting architecture data, wherein the architecture data can be used to determine an architecture designed service level in terms of application availability;
   calculating the architecture designed service level; and
   calculating an overall architecture capabilities grade for the application by comparing the architecture designed service level to the defined service level.

22. The method of claim 21, further comprising:
   developing an architecture capability chart, wherein the architecture capability chart shows historical performance, an architecture capability, and a defined service level, all in terms of availability.

23. The method of claim 21, wherein collecting includes:
   arranging a plurality of system characteristics by category, wherein each category is defined by an availability spectrum band, wherein each system characteristic is categorized according to the lowest availability level that the system characteristic can support.

24. The method of claim 23, further comprising
determining an overall architecture capability equal to the lowest availability band that all system characteristics can support.

25. The method of claim 23, wherein the overall architecture capability is equal to the lowest availability band that at least 80 percent of all system characteristics can support.

26. A method for evaluating the performance of a computer-implemented application, wherein the performance is measured in terms of availability, comprising:
collecting actual service level data, wherein the actual service level data can be used to determine an actual service level in terms of application availability;
collecting defined service level data, wherein the defined service level data can be used to determine a defined service level in terms of application availability;
calculating an actual service level in terms of application availability;
calculating a defined service level in terms of application availability;
comparing the actual service level to the defined service level using a grading scale defined as a function of the defined service level;
defining a plurality of areas of best practice, wherein each area of best practice is designed to guard against a certain problem;
defining application vulnerability data; and
calculating an overall vulnerability grade for the application and an implementation of best practices grade.

27. The method of claim 26, wherein defining application vulnerability data comprises:
collecting degree of implementation data for the areas of best practice;
collecting frequency of occurrence data defining the frequency to which best practices occur; and
collecting business impact data defining the potential economic and productivity impact should the problem occur.

28. The method of claim 27, wherein calculating an overall vulnerability grade includes:
determining business risk for each practice area, wherein the business risk is the product of the frequency of occurrence of the best practice area and the business impact;
determining an overall vulnerability score, wherein the vulnerability score is a function of the degree of implementation and the business risk for each area of best practice.

29. A computer readable medium having stored thereon instructions which, when executed by a processor, cause the processor to perform the steps of:
collecting actual service level data, wherein the actual service level data can be used to determine an actual service level in terms of application availability;
collecting defined service level data, wherein the defined service level data can be used to determine a defined service level in terms of application availability;
calculating an actual service level in terms of application availability;
calculating a defined service level in terms of application availability;
comparing the actual service level to the defined service level using a grading scale defined as a function of the defined service level, wherein the grading system comprises:
defining an availability spectrum having a top and a bottom, wherein the defined service level is between the top and the bottom, and wherein the availability spectrum is divided into a plurality of bands having boundaries defined by breakpoints, and wherein the bands have a width defined as a function of the defined service level;
defining a numerical scoring spectrum, wherein the scoring spectrum has a top and a bottom, wherein the top of the scoring spectrum corresponds to the top of the availability spectrum, and wherein the scoring spectrum is divided into a plurality of bands, and wherein the boundaries of the bands are defined by breakpoints, and wherein the breakpoints of the scoring spectrum correspond to the breakpoints of the availability spectrum; and
translating an actual service level into a service level score by interpolating between the availability spectrum and the scoring spectrum.

30. The medium of claim 29, wherein the scoring spectrum is defined by a plurality of non-uniform bands.

31. The medium of claim 29, wherein the scoring spectrum is defined by a plurality of uniform bands.

32. The medium of claim 29, wherein the availability and scoring spectrums have four breakpoints defining five bands.

33. The medium of claim 32, wherein two of the bands are situated above the defined service level and three bands are situation below the defined service level.

34. The medium of claim 29, wherein the overall service level grade is the grade associated with the band that encompasses the average of the service level scores over an evaluation period.

35. A computer readable medium having stored thereon instructions which, when executed by a processor, cause the processor to perform the steps of:
collecting actual service level data, wherein the actual service level data can be used to determine an actual service level in terms of application availability;
collecting defined service level data, wherein the defined service level data can be used to determine a defined service level in terms of application availability;
calculating an actual service level in terms of application availability;
calculating a defined service level in terms of application availability;
comparing the actual service level to the defined service level using a grading scale defined as a function of the defined service level;
collecting architecture data, wherein the architecture data can be used to determine an architecture designed service level in terms of application availability;
calculating the architecture designed service level; and
calculating an overall architecture capabilities grade for the application by comparing the architecture designed service level to the defined service level.

36. The medium of claim 35, further comprising:
developing an architecture capability chart, wherein the architecture capability chart shows historical performance, an architecture capability, and a defined service level, all in terms of availability.

37. The medium of claim 35, wherein collecting includes:
arranging a plurality of system characteristics by category, wherein each category is defined by an availability spectrum band, and wherein each system characteristic is categorized according to the lowest availability level that the system characteristic can support.

38. The medium of claim 37, further comprising
determining an overall architecture capability equal to the lowest availability band that all system characteristics can support.

39. The medium of claim 37, wherein the overall architecture capability is equal to the lowest availability band that at least 80 percent of all system characteristics can support.

40. A computer readable medium having stored thereon instructions which, when executed by a processor, cause the processor to perform the steps of:
collecting actual service level data, wherein the actual service level data can be used to determine an actual service level in terms of application availability;
collecting defined service level data, wherein the defined service level data can be used to determine a defined service level in terms of application availability;
calculating an actual service level in terms of application availability;
calculating a defined service level in terms of application availability;
comparing the actual service level to the defined service level using a grading scale defined as a function of the defined service level;
defining a plurality of areas of best practice, wherein each area of best practice is designed to guard against a certain problem;
defining application vulnerability data; and
calculating an overall vulnerability grade for the application and an implementation of best practices grade.

41. The medium of claim 40, wherein defining application vulnerability data comprises:
collecting degree of implementation data for the areas of best practice;
collecting frequency of occurrence data defining the frequency to which best practices occur; and
collecting business impact data defining the potential economic and productivity impact should the problem occur.

42. The medium of claim 41, wherein calculating an overall vulnerability grade includes:
determining business risk for each practice area, wherein the business risk is the product of the frequency of occurrence of the best practice area and the business impact;
determining an overall vulnerability score, wherein the vulnerability score is a function of the degree of implementation and the business risk for each area of best practice.

43. A system for evaluating the performance of a computer-implemented application, wherein the performance is measured in terms of availability, comprising:
a metrics data module comprising actual service level data, wherein the actual service level data can be used to determine an actual service level in terms of application availability;
a defined data module comprising defined service level data, wherein the defined service level data can be used to determine a defined service level in terms of application availability;
means for calculating the actual service level and the defined service level; and
means for comparing the actual service level to the defined service level using a grading scale defined as a function of the defined service level, wherein the grading system comprises:
an availability spectrum having a top and a bottom, wherein the defined service level is between the top and the bottom, and wherein the availability spectrum is divided into a plurality of bands having boundaries defined by breakpoints, and wherein the bands have a width defined as a function of the defined service level;
a numerical scoring spectrum, wherein the scoring spectrum has a top and a bottom, wherein the top of the scoring spectrum corresponds to the top of the availability spectrum, and wherein the scoring spectrum is divided into a plurality of bands, and wherein the boundaries of the bands are defined by breakpoints, and wherein the breakpoints of the scoring spectrum correspond to the breakpoints of the availability spectrum; and
means for translating an actual service level into a service level score.

44. The system of claim 43, wherein the grading system includes means for emphasizing lower scores.

45. A system for evaluating the performance of a computer-implemented application, wherein the performance is measured in terms of availability, comprising:
a metrics data module comprising actual service level data, wherein the actual service level data can be used to determine an actual service level in terms of application availability;
a defined data module comprising defined service level data, wherein the defined service level data can be used to determine a defined service level in terms of application availability;
means for calculating the actual service level and the defined service level;
means for comparing the actual service level to the defined service level using a grading scale defined as a function of the defined service level;
an architecture data module comprising architecture data, wherein the architecture data can be used to determine an architecture designed service level in terms of application availability; and
means for calculating the architecture designed service level and means for calculating an overall architecture capabilities grade for the application by comparing the architecture designed service level to the defined service level.

46. The system of claim 45, wherein the architecture data module includes means for assessing system characteristics according to the highest availability that the system characteristic can support.

47. A system for evaluating the performance of a computer-implemented application, wherein the performance is measured in terms of availability, comprising:
a metrics data module comprising actual service level data, wherein the actual service level data can be used to determine an actual service level in terms of application availability;
a defined data module comprising defined service level data, wherein the defined service level data can be used to determine a defined service level in terms of application availability;
means for calculating the actual service level and the defined service level;
means for comparing the actual service level to the defined service level using a grading scale defined as a function of the defined service level;

a best practices data module defining a plurality of areas of best practice, wherein each area of best practice is designed to guard against a certain problem;

a vulnerability data module defining application vulnerability data; and means for calculating an overall vulnerability grade for the application.

48. The system of claim 47, wherein the vulnerability data module comprises:

means for defining the degree of implementation for the areas of best practice;

means for defining the frequency at which best practices occur; and means for defining the potential economic and productivity impact should the problem occur.

49. The system of claim 48, wherein the vulnerability analysis module includes:

means for determining business risk for each practice area, wherein the business risk is the product of the frequency of occurrence of the best practice area and the business impact; and means for determining an overall vulnerability score, wherein the vulnerability score is a function of the degree of implementation and the business risk for each area of best practice.

* * * * *